United States Patent [19]

Sloss et al.

[11] Patent Number: 5,556,116
[45] Date of Patent: Sep. 17, 1996

[54] ADJUSTABLE RIDING TOY WITH INTERCHANGEABLE BACK ENDS

[75] Inventors: Christopher W. Sloss, Olney; Barry J. Davignon, Robinson; Duane J. Niemeyer, Olney, all of Ill.

[73] Assignee: Roadmaster Corporation, Olney, Ill.

[21] Appl. No.: 459,738

[22] Filed: Jun. 2, 1995

Related U.S. Application Data

[63] Continuation of Ser. No. 430,726, Apr. 28, 1995, and a continuation-in-part of Ser. No. 35,039, Feb. 17, 1995, and a continuation-in-part of Ser. No. 34,324, Feb. 1, 1995, abandoned, and a continuation-in-part of Ser. No. 33,934, Jan. 24, 1995, Pat. No. Des. 369,331.

[51] Int. Cl.⁶ .................................................. A63C 17/18
[52] U.S. Cl. ...................... 280/7.15; 280/229; 280/281.1
[58] Field of Search .................................. 280/7.1, 7.15, 280/229, 282, 287, 278, 281.1

[56] References Cited

U.S. PATENT DOCUMENTS

| | | |
|---|---|---|
| D. 279,464 | 7/1985 | Kane . |
| D. 280,087 | 8/1985 | Wing-Fong ............................ D12/112 |
| D. 289,272 | 4/1987 | Phinney . |
| D. 296,774 | 7/1988 | Armstrong . |
| D. 300,619 | 4/1989 | Phinney et al. . |
| D. 337,973 | 8/1993 | Mariol .................................. D12/112 |
| 605,182 | 6/1898 | Johnston ................................. 280/229 |
| 2,209,058 | 7/1940 | Johnson . |
| 2,209,804 | 7/1940 | Ashley . |
| 2,555,480 | 6/1951 | Fischer . |
| 2,708,119 | 5/1955 | Best . |
| 3,229,988 | 1/1966 | Mansperger . |
| 3,352,570 | 11/1967 | Cordrey ................................... 280/282 |
| 3,368,823 | 2/1968 | Templeton . |
| 3,658,354 | 4/1972 | Read ................................... 280/278 X |
| 3,694,004 | 9/1972 | Siebers . |
| 3,724,873 | 4/1973 | Glamb et al. . |
| 4,103,921 | 8/1978 | Brooks et al. . |
| 4,546,991 | 10/1985 | Allen et al. . |
| 4,596,398 | 6/1986 | Grossi . |
| 4,824,131 | 4/1989 | Thay ........................................ 280/278 |
| 4,917,394 | 4/1990 | Lin . |
| 5,002,295 | 3/1991 | Lin ........................................ 280/205 |
| 5,133,569 | 7/1992 | Rieber et al. ........................ 280/295 X |
| 5,249,847 | 10/1993 | Lee . |

OTHER PUBLICATIONS

Target Ad from newspaper, Dec., 1994.
Famoplay Catalog, prior to Nov. 1, 1993.

*Primary Examiner*—Kevin Hurley
*Assistant Examiner*—Victor E. Johnson
*Attorney, Agent, or Firm*—Craig A. Summerfield; Brinks Hofer Gilson & Lione

[57] ABSTRACT

Adjustable riding toys are provided in both bicycle and tricycle forms. The bicycle and tricycle each have the same front end with only differing back ends. Each back end connects to the front end. One back end has two wheels, while the other back end has one wheel. Methods of manufacturing and distributing the embodiments of the bicycle and tricycle are also provided.

15 Claims, 7 Drawing Sheets

ADJUSTABLE RIDING TOY WITH INTERCHANGEABLE BACK ENDS

CROSS REFERENCE TO RELATED APPLICATIONS

The present application is a continuation of application Ser. No. 08/430,726, filed Apr. 28, 1995, and a continuation-in-part of application Ser. No. 29/035,039, filed Feb. 17, 1995, and a continuation-in-part of application Ser. No. 29/034,324, filed Feb. 1, 1995 now abandoned, and a continuation-in-part of application Ser. No. 29/033,934, filed Jan. 24, 1995 U.S. Pat. no. 369,331, the disclosures of which are hereby incorporated by reference.

BACKGROUND OF THE INVENTION

The present invention relates to children's riding toys and more particularly to an assembly for adjusting the riding toy. The height of the riding toy, the number of wheels on the riding toy, the position of the training wheels and the type of ride all adjust on one toy.

Wheeled riding toys of various configurations are known. However, many aspects common to most riding toys have drawbacks.

Two-wheeled and three-wheeled riding toys are common. These two types of riding toys require many different parts. Thus, the cost to manufacture two separate toys is made more expensive.

Generally, riding toys will have adjustable seat and handle bar heights to accommodate people of various sizes. These adjustments allow one riding toy to be used by the same child over a period of limited time and limited growth. However, these adjustments only adjust to a certain point before a child can no longer comfortably ride the riding toy. A new riding toy then must be purchased.

Riding toys allow mobility as a form of enjoyment, but rarely more. Children often resort to horns, spoke clackers or other decorations to add enjoyment to riding a wheeled toy. New forms of riding enjoyment are constantly sought.

Two-wheeled riding toys take more skill and balance to ride than three-wheeled riding toys. As a means to help beginning riders develop the needed balance, training wheels are often provided. Training wheels typically consist of a bracket connected to the body of a riding toy, and a wheel connected to the bracket. However, these training wheels require multiple parts which may be lost, especially when the training wheels are removed. Multiple parts also contribute to increased costs.

SUMMARY OF THE INVENTION

The preferred embodiments of the instant invention provide solutions to all of these problems. In one aspect, the invention is a wheeled riding toy with an adjustable height axle connection comprising a body with a seat thereon, one or more wheels rotatably attached to the body, a mounting arm connected to the body, one wheel having an axle, and the one wheel being rotatably connected to the mounting arm, wherein the mounting arm has at least two axle apertures, and the axle is disposed within one of the axle apertures.

In a second aspect, the invention is a wheeled riding toy having a body comprising a monolithic back end portion having a plurality of predetermined connection apertures, a rear wheel rotatably attached to the back end portion, a from mounting arm pivotally connected to the body with a steering mechanism connected thereto, a front wheel rotatably connected to the front mounting arm, and a training wheel assembly comprising a training wheel having a training wheel axle aperture, a training wheel axle operatively connected to the training wheel at the training wheel axle aperture, and the training wheel axle releasably connected to one of the connection apertures.

In a third aspect, the invention is a wheeled riding toy having an engageable wave ride wheel comprising a body, a first rear wheel rotatably attached to the body, a from mounting arm pivotally connected to the body with a steering mechanism connected thereto, a front wheel rotatably attached to the front mounting arm, and any one of the front or first rear wheels comprising a wave ride wheel having a center and at least two wheel axle apertures, at least one wheel axle aperture not being at the center of the wheel.

In a fourth aspect, the invention is a combination of four members, three of which fit together to form a bicycle and three of which fit together to form a tricycle, the four members comprising a body having a first and second body end; a front wheel rotatably connected to the first body end; a bicycle back end comprising at least one prong back end, each prong back end connectable to the second body end and a back end wheel rotatably connected to each prong back end; and a tricycle back end comprising at least one prong back end, each prong back end connectable to the second body end and a first and second rear wheel, each rear wheel rotatably connected to each prong back end.

Through the use of the preferred interchangeable back ends, manufacturing costs are decreased. The parts for the body of the riding toy are the same no matter which back end is used.

The preferred embodiments also allow for a larger range of growth before a new riding toy purchase is necessary. A height adjustment where an axle connects to the riding toy is provided. The riding my has multiple apertures to connect with an axle. By adjusting which aperture on the riding toy is used for the front axle, the distance from the pedals to the handle bars is increased, allowing a larger person to use the riding toy.

The preferred embodiments also provide added enjoyment to riding. Multiple apertures in the wheels are provided, where at least one aperture is not at the center of the wheel. By placing the axle through the off-center aperture, a wave ride, or up and down, effect is created. In a tricycle configuration, one rear wheel may be adjusted, or both, to create a side to side effect along with the up and down motion. Allowing adjustment from regular smooth rides to the wave ride maintains the classic uses of the riding toy while providing an added aspect of enjoyment.

The preferred embodiments also require fewer parts for the training wheels, avoiding lost parts. The training wheels connect right to the body of the riding toy and may be adjusted upward, downward or removed to accommodate riders of various skill. These and other advantages of the invention, as well as the preferred embodiments, will be best understood by reference to the attached drawings.

DETAILED DESCRIPTION OF THE PRESENTLY PREFERRED EMBODIMENTS

Figure 1:
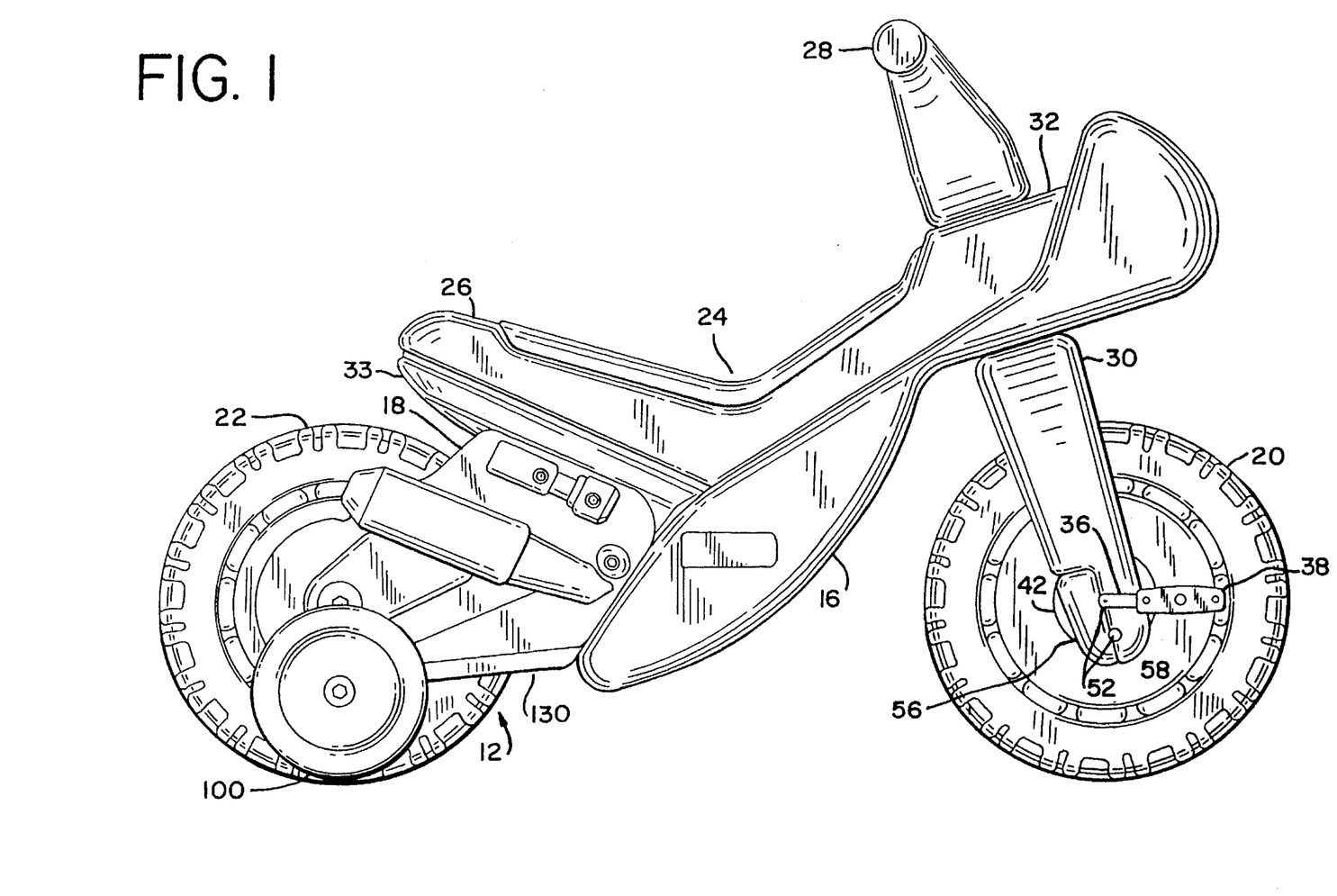
FIG. 1 is a right side view of a bicycle adjustable riding toy.
Figure 2:
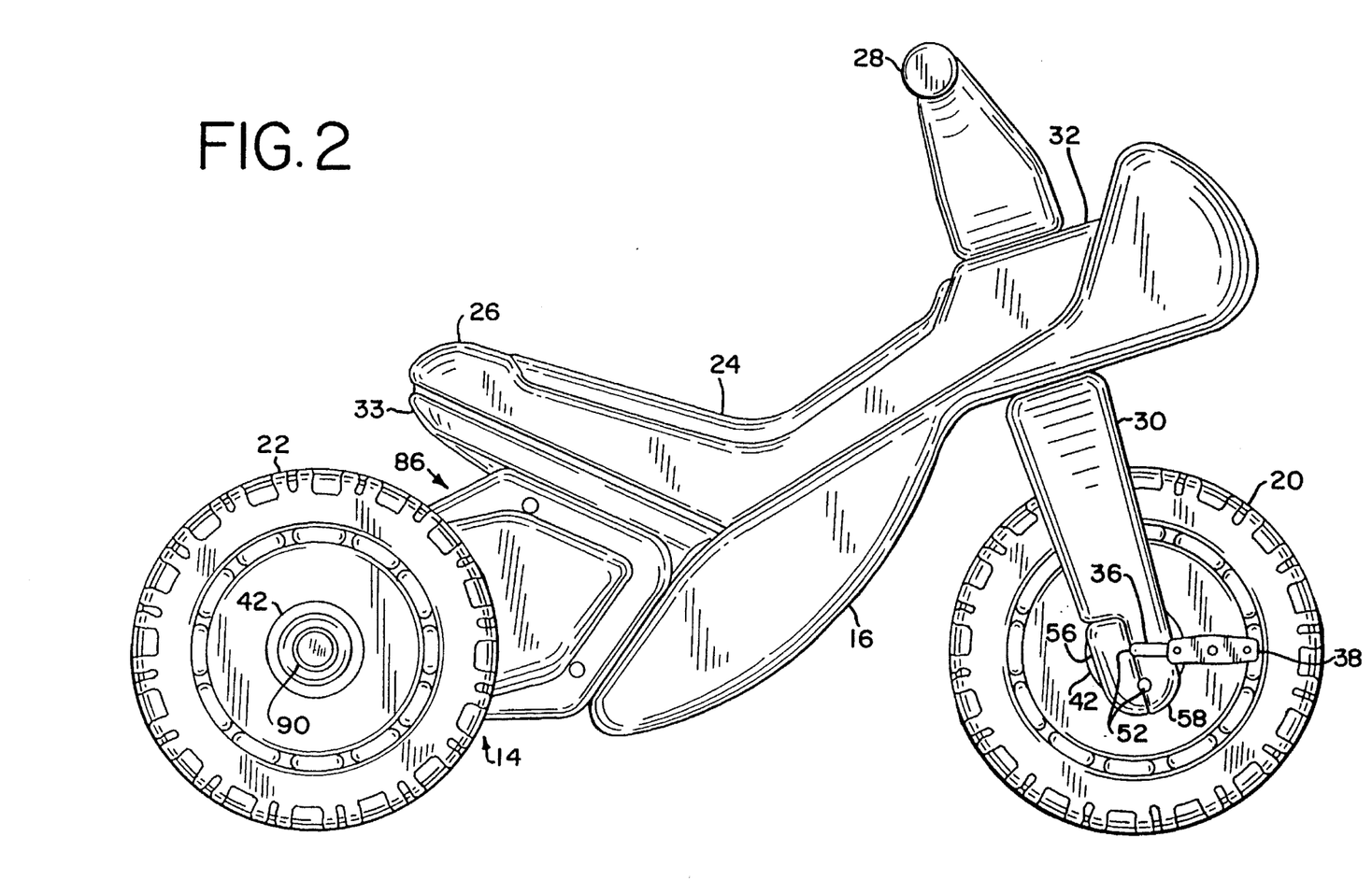
FIG. 2 is a right side view of a tricycle adjustable riding toy.
Figure 7:
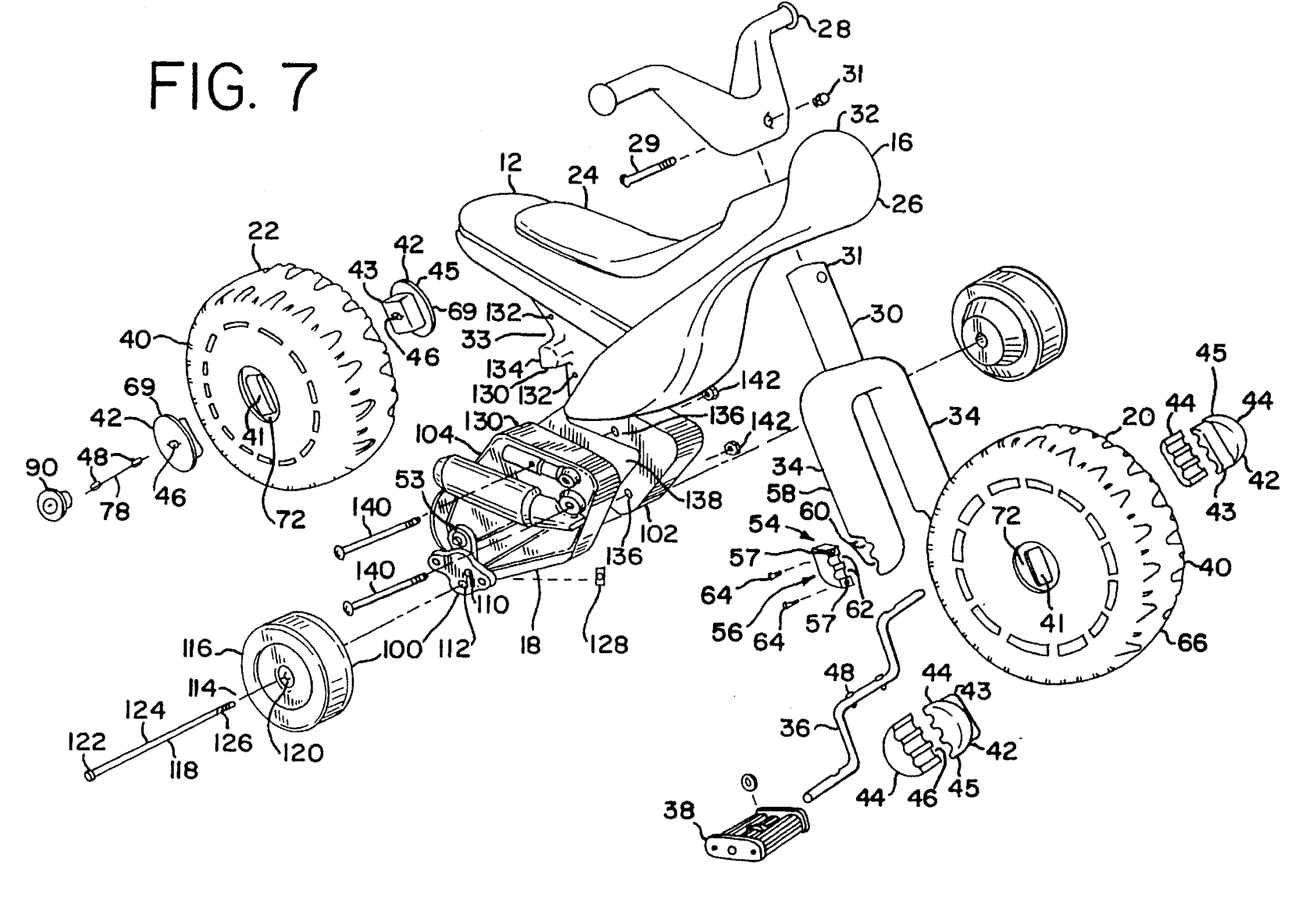
FIG. 7 is an exploded right front perspective view of the bicycle adjustable riding toy of FIG. 1.
Figure 9:
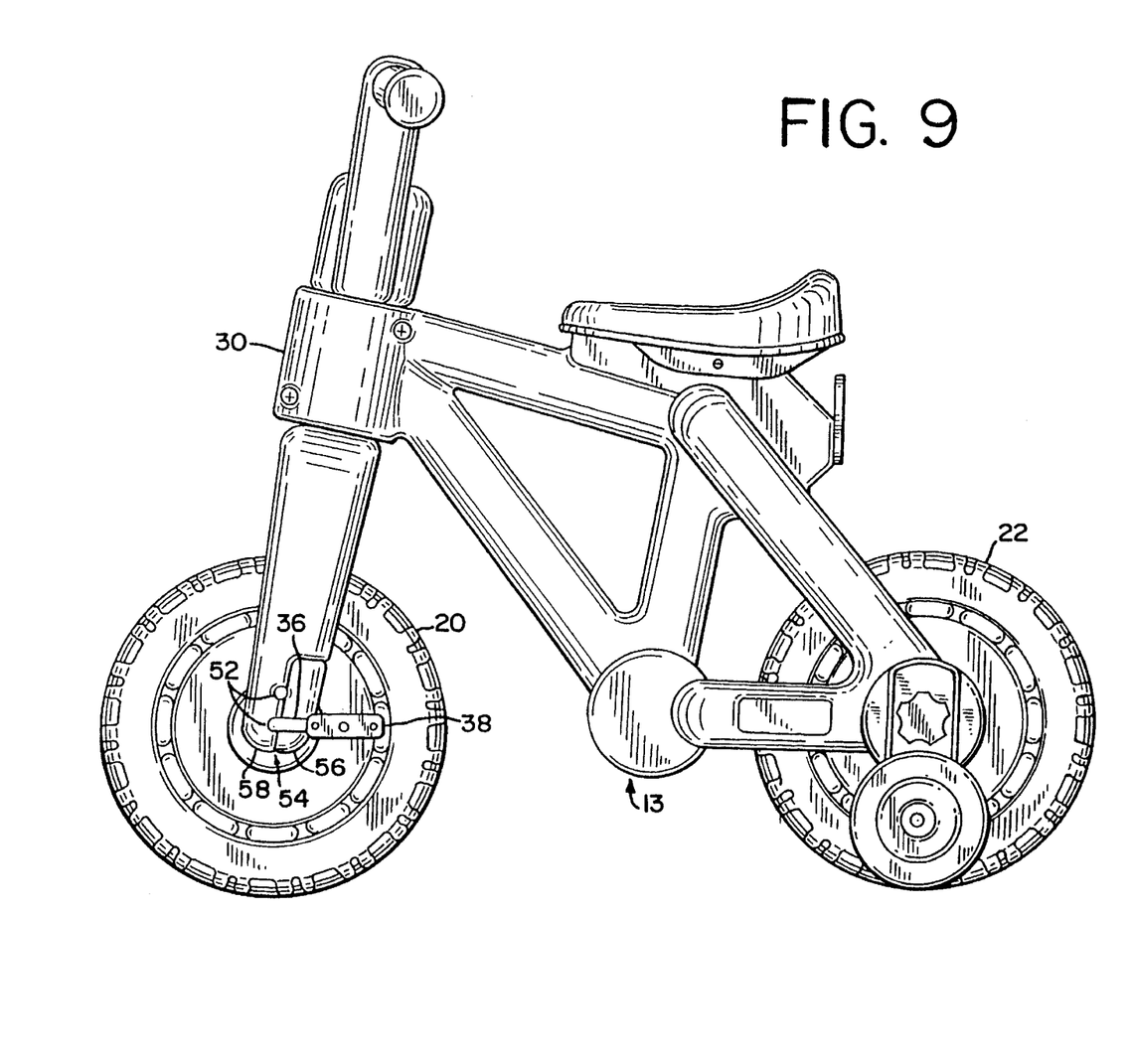
FIG. 9 is a left side view of another embodiment of a bicycle adjustable riding toy.

Referring now to the drawings, two preferred embodiments of riding toys are illustrated and generally indicated at 12 and 14 in FIGS. 1 and 2. FIGS. 1 and 9 depict the use of this invention on a bicycle 12 and 13, and FIG. 2 depicts the use of this invention on a tricycle 14. Referring to FIGS. 1 and 7, the bicycle 12 embodiment of the present invention will be used to illustrate one preferred embodiment. However, many aspects of the invention may be adapted for use on riding toys with any number of wheels.

The bicycle 12 comprises a body 16, a bicycle back end 18, a front wheel 20 and a rear wheel 22. The construction is preferably from suitable molded plastic material and is generally known in the industry. However, the present invention may be constructed from any other suitable materials, such as various metals. The body 16 is connected to the bicycle back end 18. The connection will be addressed in more detail below. The from and rear wheels 20 and 22 are rotatably connected to the body 16 and bicycle back end 18, respectively, to allow the bicycle 12 to roll. A seat 24 for holding the body of a rider is preferably molded into the body 16, but may be attached as a separate piece.

The body 16 comprises a support 26, a steering mechanism 28, and a front mounting arm 30. The from mounting arm 30 is pivotally connected to the body from end 32. Referring to FIG. 7, the steering mechanism 28 connects to the from mounting arm 30, preferably with a bolt 29 and nut 31, to allow a rider to steer the bicycle 12. The from mounting arm 30 comprises one or more prong arms 34. Preferably two prong arms 34 are used for maximum stability. The from wheel 20 rotatably connects to the prong arms 34 and is preferably located between the prong arms 34.

The from wheel 20 rotatably connects to the prong arms 34 by a from axle 36. The from axle 36 is preferably made out of a suitable metal. A pedal 38 is connected to each end of the from axle 36 by a washer with serrations for gripping the from axle 36. The washer keeps the pedal 38 from sliding off of the from axle 36. The from axle 36 is shaped as is common to allow circular motion from a rider's feet to create rotation of the from wheel 20.

Figures 3, 4:
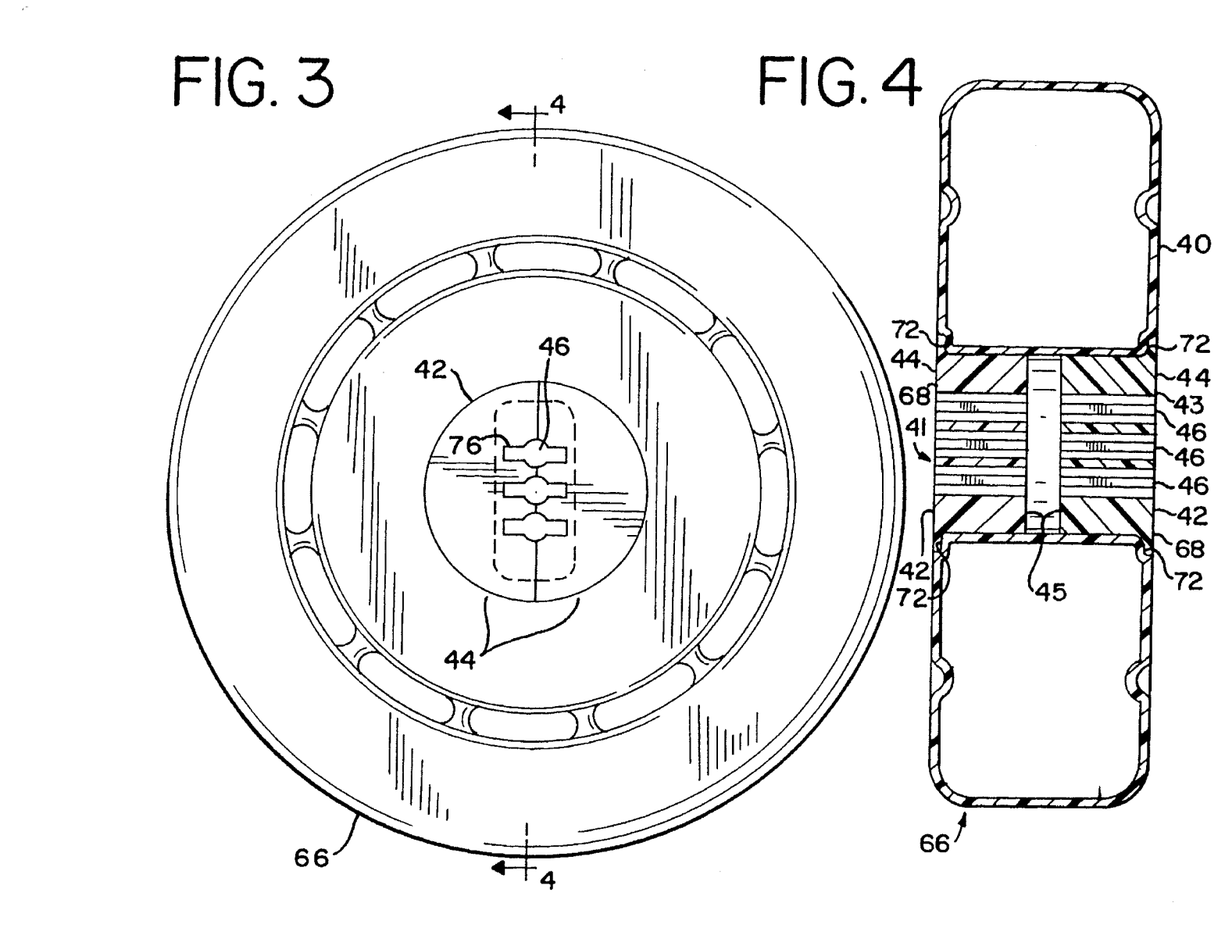
FIG. 3 is a side view of a wheel assembly using spacer quarters used on the tricycle adjustable riding toy of FIG. 2.
FIG. 4 is a cross section view of a wheel assembly of FIG. 3 taken along line 4—4.

The front wheel 20 and rear wheel 22 each comprise an outer wheel 40 having a holder aperture 41 and two sides, and a spacer, designated generally at 42. For the front wheel 20, the spacer 42 comprises four spacer quarters 44. Referring to FIG. 3 and as discussed in more detail below, the four spacer quarters 44 are placed together to create wheel axle apertures 46 for receiving the front axle 36. Referring again to FIG. 1, the front wheel 20 is rotatably connected to the prong arms 34 by placing the front axle 36 through an axle aperture 52 located on each prong arm 34. The front axle 36 is allowed to rotatably move within the axle aperture 52.

An adjustable height axle connection is shown generally in FIGS. 7 at 54. The prong arms 34 comprise a first prong piece 56 and a second prong piece 58. The first prong piece 56 of each prong arm 34 has multiple first edge cut outs 60, which are preferably half-circular in shape. In the preferred embodiment, there are two first edge cut outs 60, one placed above the other in reference to the ground. However, there may be more than two first edge cut-outs 60 and the first edge cut outs 60 may be placed in a horizontal relation to each other.

Preferably, the second prong piece 58 also has two second edge cut-outs 62. As long as the first prong piece 56 has first edge cut-outs 60, the second prong piece 58 does not have to have second edge cut-outs 60 and vice versa. Alternatively, the first prong piece 56 may have one first edge cut-out 60 as long as the second prong piece 58 has a second edge cut-out 62 which does not align with the first edge cut out 60 when the first prong piece 56 is mounted to the second prong piece 58, as discussed in more detail below. It is noted that one axle aperture 52 which creates two separate areas for holding the front axle 36 is within the scope of the present invention by effectively creating two axle apertures 52.

Referring to FIG. 1, when the first prong piece 56 is mounted to the second prong piece 58, the two first edge cut-outs 60 preferably align with the two second edge cut-outs 62 to form two axle apertures 52. Preferably, two apertures 57 are molded into the first prong piece 56 for accepting at least one screw, and preferably two screws 64, suitable for mounting in plastic. The screws 64 mount the first prong piece 56 to the second prong piece 58. The second prong piece 58 has molded plastic formed to be suitable for securely holding the screws 64. Furthermore, straps, clamps or other mounting means may be used to mount the first prong piece 56 to the second prong piece 58.

Referring to FIG. 7, to adjust the height of the riding toy 10, first the screws 64 are removed from the prong arms 34. Then, the first prong piece 56 is separated from the second prong piece 58. The front axle 36 is taken from a position alongside one of the second edge cut-outs 62 and placed in a position along side another second edge cut-out 62. The first prong piece 56 is then mounted to the second prong piece 58 with the screws 64. The front axle 36 is now located in a different axle aperture 52. By placing the axle 36 in a different axle aperture 52, the distance between the steering mechanism 28 and the pedals 38 may be increased or decreased, allowing different sized people to ride the riding toy 10. The adjustable height axle connection 54 may also increase or decrease the distance from the seat 24 to the ground. The adjustable height axle connection 54 may also be used on the rear wheel 22, but that embodiment is not preferred.

Figure 5:
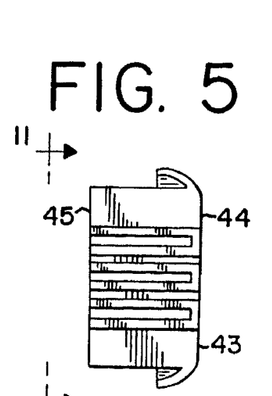
FIG. 5 is an elevational side view of a spacer quarter used in the wheel assembly of FIG. 3.

The engageable wave ride wheel is shown generally in FIGS. 3, 4 and 7 at 66. Referring to FIGS. 3, 4, 5 and 6, for the front wheel 20, there are four spacer quarters 44 which comprise the spacer 42. Two spacer quarters 44 will form a spacer half 68, when the spacer quarter flat sides 70 are placed adjacent to each other as shown in FIG. 3. Preferably the spacer half 68 will be circular in shape on one end 43 and rectangular on the other end 45 as shown in FIGS. 5 and 7.

Referring to FIGS. 4 and 7, the rectangular end 45 of the spacer half 68 fits within the rectangular holder aperture 41 of the outer wheel 40 so that as the spacer half 68 rotates, the outer wheel 40 also rotates. Two spacer halves 68 are placed within the holder aperture 41 of the outer wheel 40. Each spacer half 68 is positioned from opposite sides of the outer wheel 40 into retention grooves 72.

Figure 6:
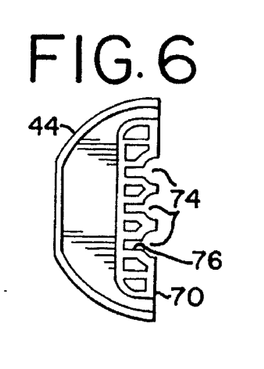
FIG. 6 is an elevational end view of the spacer quarter of FIG. 5.

Referring to FIGS. 3, 6 and 7, each spacer quarter 44 has at least two spacer cut-outs 74. The spacer cut-outs 74 are located on the spacer quarter's flat side 70. When the spacer quarters flat sides 70 are placed next to each other to create a spacer half 68, the spacer cut-outs 74, will align to create at least two wheel axle apertures 46. Preferably, one wheel axle aperture 46 is located at the center of the spacer half 68 with two other wheel axle apertures 46 located on opposite sides of center. Each wheel axle aperture 46 preferably is circular in shape with a linear notch 76 for functionally accepting a swedge 48 on the from axle 36. As the front axle 36 rotates, the swedges 48 engage the linear notch 76 forcing the spacer 42 and outer wheel 40 to also rotate.

When the front axle 36 is placed through the wheel axle aperture 46 located at the center of the front wheel 20, a level ride occurs. However, when the front axle 36 is placed through a wheel axle aperture 46 located in a position other than the center of the front wheel 20, an up and down motion in the riding toy 10 is created as the riding toy 10 moves.

To adjust the engageable wave ride wheel 66, the from axle 36 is removed from one wheel axle aperture 46 and placed in another wheel axle aperture 46. On the front wheel 20, which uses spacer quarters 44, adjusting the engageable wave ride wheel 66 requires removing the from wheel 20 and from axle 36 from between the prong arms 34 as discussed above. A spacer quarter 44 is removed from each side of the outer wheel 40. The front axle 36 is removed from a position adjacent one spacer cut-out 74 on each spacer quarter 44 remaining in the outer wheel 40. The front axle 36 is then placed in a position adjacent a different spacer cut-out 74. The front axle 36 is preferably positioned in a similar manner for each spacer half 68 on the from wheel 20. The removed spacer quarters 44 are then placed adjacent the spacer quarters 44 still within the outer wheel 40, creating the wheel axle apertures 46. The front wheel 20 and from axle 36 are then connected to the bicycle 12 as discussed above. For a bicycle 12 meant to be used with training wheels 116, the wave ride wheel is not used on the rear wheel 22 to avoid toppling a rider.

Referring now to FIG. 7, the predetermined frame supported adjustable height training wheels are generally designated at 100. The predetermined frame supported adjustable height training wheels 100 are shown on a bicycle 12, but may be used on a riding toy with any number of wheels.

The predetermined frame supported adjustable height training wheels 100 are preferably located one on each side of the bicycle 12. However, only one predetermined frame supported adjustable height training wheel 100 is required. Furthermore, the predetermined frame supported adjustable height training wheel(s) 100 are preferably but not necessarily placed near the rear wheel 22.

The rear wheel 22 is rotatably connected to the bicycle back end 18 of the bicycle 12 by a bicycle back axle 78. The bicycle back end 18 may be part of a continuous support 26 of the bicycle 12. Preferably, the bicycle back end 18 comprises a left prong back end 102 and a right prong back end 104, with the rear wheel 22 held in place by the bicycle back axle 78 between the left and right prong back ends 102 and 104. The bicycle back axle 78 is placed through the axle aperture 52 on the left and right back ends 102 and 104, and through the wheel axle aperture 46 on the bicycle rear wheel spacer halves 69. The bicycle back axle 78 is held in place by two snap-fit axle caps 90 which snap-fit onto the swedges 48 on each end of the bicycle back axle 78.

For purposes of the preferred embodiment of the predetermined frame supported adjustable height training wheels 100, the rest of the discussion will deal with only the right predetermined frame supported adjustable height training wheel 100. It is understood that the left predetermined frame supported adjustable height training wheel 100 is the same. The bicycle back end 18 has upper and lower connection apertures 110 and 112. The upper and lower connection apertures 110 and 112 are located on the monolithic right prong back end 104. The monolithic right prong back end 104 is, for example, one uniform blow molded part. There are no separate brackets for connection of the training wheel assembly, generally noted at 114, to the bicycle back end 18. The upper connection aperture 110 is located at least partially above the lower connection aperture 112. Preferably, the upper connection aperture 110 is placed slightly forward of the lower connection aperture 112 for structural strength, but may be placed slightly rearward.

The training wheel assembly, generally noted at 114, comprises a training wheel 116 and a training wheel axle 118. The training wheel 116 has a centrally located training wheel axle aperture 120 for rotatably connecting to the training wheel axle 118. The training wheel axle 118 comprises a training wheel axle head 122, shaft 124 and threaded end 126. The training wheel axle 118 is slid through the training wheel axle aperture 120 until the training wheel axle head 122 prevents any further sliding. The training wheel axle threaded end 126 is then placed in either the upper or lower connection apertures 110 or 112. Pressed into the upper and lower connection apertures 110 and 112 on the side of the right prong back end 104 opposite the training wheel 116 is a metal t-nut assembly 128. The training wheel axle threaded end 126 is threaded into a t-nut assembly 128. The t-nut assembly 128 prevents over tightening the training wheel axle head 122 against the training wheel 116. Other attachments which allow rotation of the training wheel but hold the training wheel axle 118 in place may be used, like a cotter pin assembly.

Preferably, the lower connection aperture 112 is placed above the lowest part of the rear wheel 22 by a distance approximately equal to the radius of the training wheel 116. The upper connection aperture 110 will be at a position slightly higher than the lower connection aperture 112. By connecting the training wheel axle 120 to the lower connection aperture 112, maximum stability from side to side tilting of the bicycle 12 is achieved. When the training wheel axle 118 is connected to the upper connection aperture 110, some side to side tilting of the bicycle 12 is allowed, but the training wheels 116 will still prevent the bicycle 12 from tipping over. By disconnecting the training wheel axle 118 from the bicycle back end 18, the bicycle 12 may be used without any added stability from training wheels 116.

The training wheel axle 118 is adjusted from the lower connection aperture 112 to the upper connection aperture 110, or vise versa, by first unthreading the training wheel axle threaded end 126 from the t-nut assembly 128. The training wheel axle 118 is then placed within the upper or lower connection aperture 110 or 112 and threaded into the t-nut assembly 128. To remove the training wheel assembly 114, the training wheel axle 118 is unthreaded from the t-nut assembly 128.

Referring to FIG. 9, a second bicycle 13 is shown. The second bicycle incorporates the adjustable height axle connection 54 described above.

Figure 8:
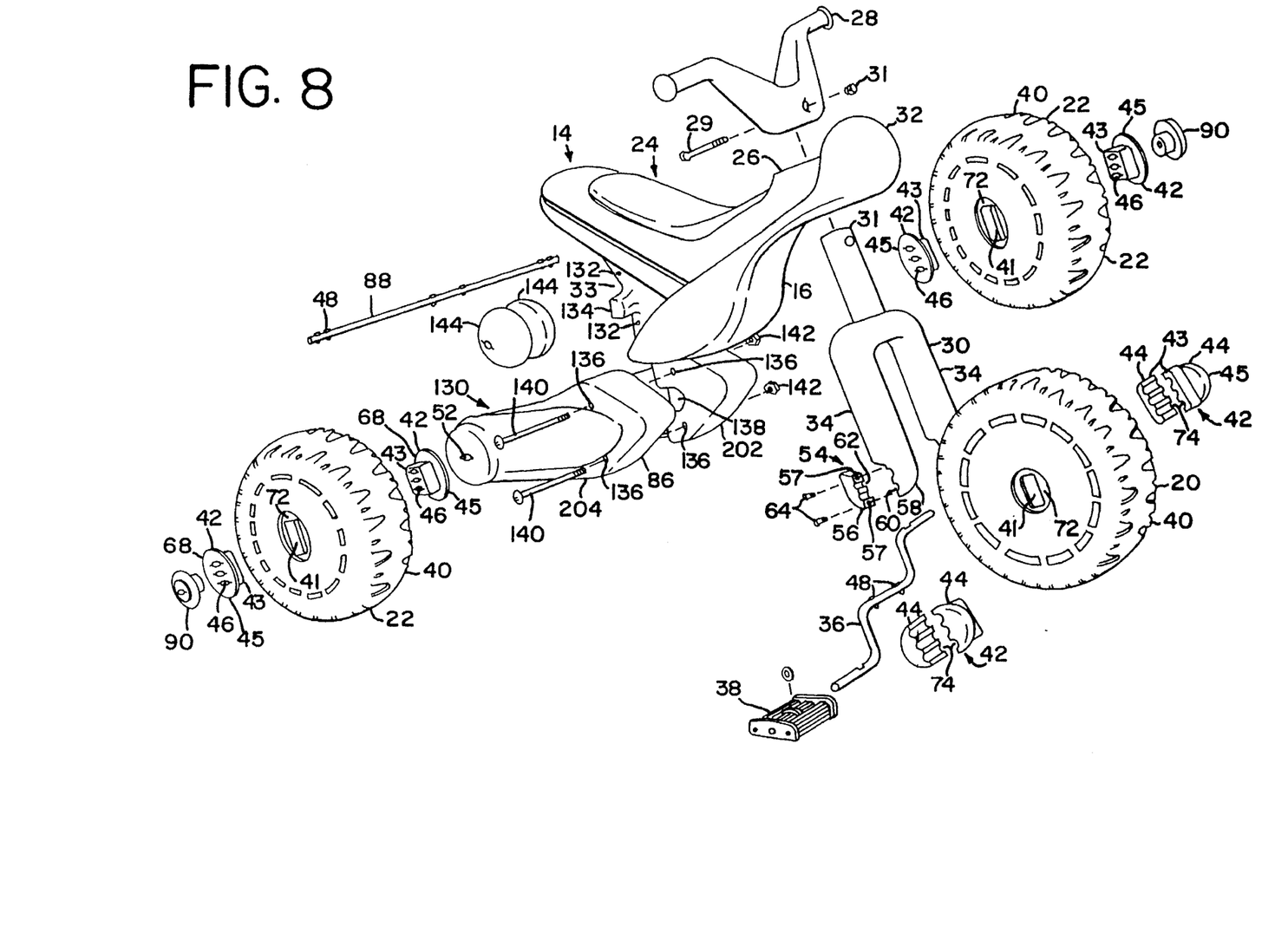
FIG. 8 is an exploded right front perspective view of the tricycle adjustable riding toy of FIG. 2.

Referring to FIG. 2 and 8, the tricycle 14 incorporates the adjustable height axle connection 54 described above. The tricycle 14 also incorporates the engageable wave ride wheel 66 described above for the front wheel 20.

Referring now to FIG. 8, the engageable wave ride wheel 66 is used on each rear wheel 22 of the tricycle 14. A different preferred embodiment is used for the engageable wave ride wheel 66 as used on the rear wheels 22. Only one rear wheel 22 on the tricycle 14 will be discussed, but it is understood that the two rear wheels 22 are preferably identical. Where the engageable wave ride wheel 66 is used on the rear wheel 22, the spacer 42 preferably comprises two spacer halves 68. The spacer halves 68 are placed within the outer wheel 40 in retention grooves 72. Each spacer half 68 is placed on a different side of the outer wheel 40.

Each spacer half 68 preferably has three wheel axle apertures 46, but may have only one wheel axle aperture 46 where a wave ride wheel is not desired, like on the rear wheel 22 of the bicycle 12. Two wheel axle apertures 46 may also suffice to create an engageable wave ride wheel 66. One wheel axle aperture 46 is preferably located at the center of the assembled rear wheel 22. Referring to FIGS. 8, the tricycle back axle 88 is placed through a wheel axle aperture 46 and an axle apertures 52. The tricycle back axle 88 is held in place with snap-fit axle caps 90 which connect to swedges 48. Further, other means may be available to hold the tricycle back axle 88 in place such as a nut and bolt.

To adjust the engageable wave ride wheel 66, the axle cap 90 is removed from the tricycle back axle 88. The tricycle back axle 88 is removed from one wheel axle aperture 46 and placed back through a different wheel axle aperture 46. The axle cap 90 is then reattached to the tricycle back axle 78 or 88.

Referring to FIG. 8, the engageable wave ride wheel 66 may be adjusted on either or both rear wheels 22 on a tricycle 14. The tricycle back axle 88 has multiple swedges 48. The swedges 48 are placed in a linear notch 76 on each spacer half 68, creating synchronous rotation of the rear wheels 22. Each spacer half 68 has three wheel axle apertures 46, one located at the center of the rear wheel 22 and the other two on opposite sides of the wheel axle aperture 46 at the center of the rear wheel 22 as shown in FIG. 8. By adjusting the engageable wave ride wheel 66 on one rear wheel 22 to one off-center wheel axle aperture 46 and adjusting the tricycle back axle 88 on the other rear wheel 22 to the wheel axle aperture 46 on the different side of center, synchronous rotation of the rear wheels 22 creates a side to side wobble of the tricycle back end 86. By adjusting the tricycle back axle 88 on both rear wheels 22 to wheel axle apertures 46 on the same side of the rear wheel's 22 center, the side to side effect is eliminated but the up and down motion is maintained.

Figure 10:
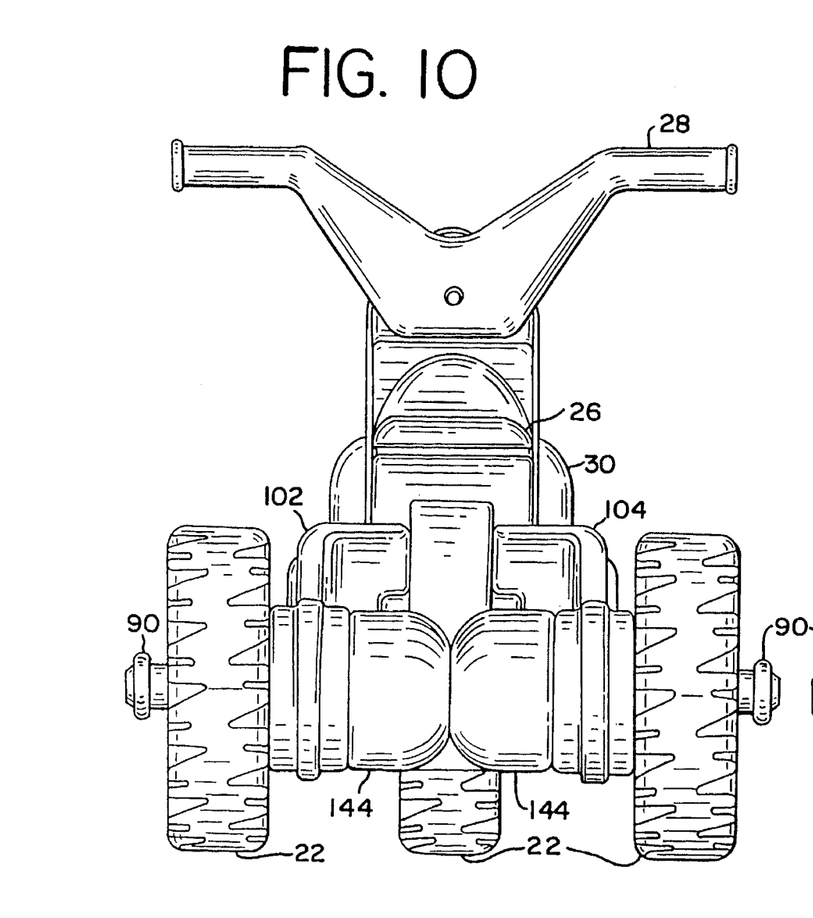
FIG. 10 is a rear view of the tricycle adjustable riding toy of FIG. 2 with spacers between the wheels.
Figure 11:
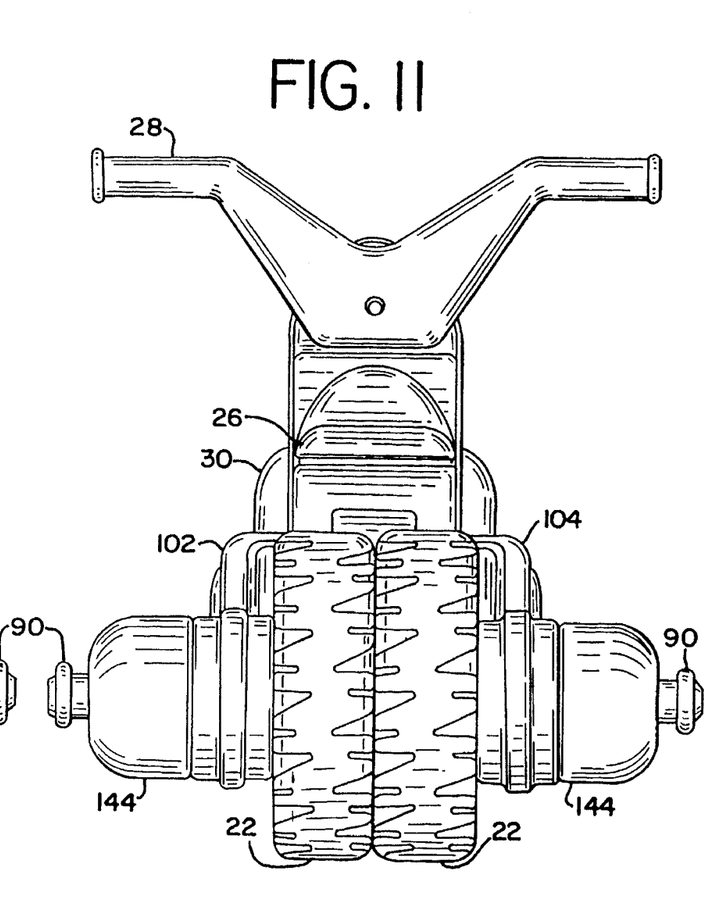
FIG. 11 is a rear view of the tricycle adjustable riding toy of FIG. 2 with the rear wheels placed next to one another.

Referring to FIGS. 10 and 11, a method of changing a tricycle 14 into a bicycle 12 is shown. By removing the axle cap 90, the tricycle back axle 88 can then be removed. The rear wheels 22 are placed between the left and right prong back ends 202 and 204. Tricycle spacers 144 are placed on the outside of the left and right prong back ends 202 and 204. The tricycle back axle 88 is then replaced, and the axle cap 90 is snapped onto the tricycle back axle 88.

Referring to FIGS. 7 and 8, to manufacture a bicycle 12 or tricycle 14 less expensively, interchangeable back ends, generally designated at 130, are used. The body 16 has two interchange apertures 132, on the body back end 33. Preferably, between the interchange apertures 132 and on both sides of the body 16 is a protrusion 134.

A bicycle back end 18 preferably comprises a rear wheel 22 between a left and right prong back end 102 and 104. The tricycle back end 86 preferably comprises two rear wheels 22, each placed on the outside of a left and right prong back end 202 and 204 and two tricycle spacers 144 positioned between the left and right prong back ends 202 and 204.

Back end apertures 136 are located on the end of the left and right prong back ends 102 and 104, and 202 and 204, opposite the rear wheel(s) 22. Between the back end apertures 136 on both the left and right prong back end 102 and 104, and 202 and 204, is a depression 138 shaped to fit around the protrusion 134. Each protrusion 134 will fit within each depression 138, and the back end apertures 136 will align with each interchange aperture 132. The protrusion 134 is designed to snap-fit into the depression 138. Both the protrusion 134 and the depression 138 are preferably not circular in shape to add structural support to the riding toy 10.

Two interchange bolts 140 fit through the back end apertures 136 on both the left and right prong back ends 102 and 104, and 202 and 204, and the interchange apertures 132. Two interchange nuts 142 are threaded onto the interchange bolts 140. The interchange bolts 140 and each protrusion 134 within a depressions 138 hold the interchangeable back end 130 to the body 16 and prevent any movement of the interchangeable back end 130 counter to the body 16. Other devices, such as a clamp, may fasten the interchangeable back end 130 to the body 16.

Interchangeable back ends 130 allow the same front wheel 20 and body 16 to be used on both a tricycle 14 or bicycle 12. The front wheel 20 and the rear wheels 22 use the same outer wheel 40. To manufacture a bicycle 12, the bicycle back end 18 is combined with a body 16 and front wheel 20. To manufacture a tricycle 14, the tricycle back end 86 is combined with a body 16 and a front wheel 20. Furthermore, a bicycle back end 18 may even be changed to a tricycle back end 86 or vise versa.

It is the following claims, including all equivalents, which are intended to define the scope of this invention.

We claim:

1. A combination of four members, three of which fit together to form a bicycle and three of which fit together to form a tricycle, the four members comprising:
   a) a body having a first and second body end, the second body end having a first and second side, at least a first protrusion on the first side, the first side having a first recession formed around the first protrusion;
   b) a front wheel rotatably connected to the first body end;
   c) a bicycle back end comprising:
      i) at least one prong back end, each prong back end connectable to the second body end, the first recession for receiving the at least one prong back end, and each prong back end having a depression for receiving said protrusion; and
      ii) an only rear wheel rotatably connected to each prong back end; and
   d) a tricycle back end comprising:
      i) at least one prong back end, each prong back end connectable to the second body end, the first recession for receiving the at least one prong back end, and each prong back end having a depression for receiving said protrusion; and
      ii) only first and second rear wheel, each rear wheel rotatably connected to each prong back end.

2. The combination of claim 1, wherein the body, the front wheel and the bicycle back end fit together to form the bicycle.

3. The combination of claim 2 wherein a training wheel connects to the bicycle back end.

4. The combination of claim 1, wherein the body, the front wheel and the tricycle back end fit together to form the tricycle.

5. The combination of claim 1, wherein:
   a) each prong back end has an aperture for receiving a bolt; and
   b) the second body end has a second aperture for receiving the bolt.

6. The combination of claim 5 wherein:
   a) each prong back end has a second aperture for receiving a second bolt; and
   b) the second body end has a second aperture for receiving the second bolt.

7. The combination of claim 1, wherein:
   a) there are two prong back ends on the bicycle back end; and
   b) there are two prong back ends on the tricycle back end.

8. The combination of claim 7 wherein: a) a second protrusion is on the second side;
   b) the second protrusion receivable by the depression of the second of said two prong back ends on the bicycle back end and the depression of the second of said two prong back ends on the tricycle back end.

9. The combination of claim 8 wherein each of said depressions can snap-fit on one of said protrusions.

10. The combination of claim 8 wherein:
    a) each of said protrusions is oblong; and
    b) each of said depressions is shaped to fit the oblong protrusion.

11. The combination of claim 8 wherein the second side has a second recession formed around the second protrusion for receiving the second prong back end.

12. The combination of claim 11 wherein:
    a) each of said recessions is oblong; and
    b) each of said prong back ends is shaped to fit the oblong recession.

13. The combination of claim 1, wherein the front wheel, rear wheel, first rear wheel and second rear wheel each comprise an outer wheel and a spacer, and the outer wheel of each wheel is identical.

14. The combination of claim 1, wherein the front wheel comprises a wave ride wheel having a center and at least two wheel axle apertures, one of said wheel axle apertures not being at the center of the wheel.

15. The combination of claim 1, wherein
    a) the first body end comprises a front mounting arm having at least two axle apertures;
    b) the front wheel has an axle for rotatably connecting the wheel to the first body end; and
    c) the axle is disposed within one of the axle apertures.

* * * * *